United States Patent [19]
Mitchell

[11] Patent Number: 5,407,716
[45] Date of Patent: Apr. 18, 1995

[54] MASKING METHODS USING FLEXIBLE STRIP

[75] Inventor: Philip A. Mitchell, Atherstone, England

[73] Assignee: Minnesota Mining and Manufacturing Company, St. Paul, Minn.

[21] Appl. No.: 122,501

[22] Filed: Sep. 28, 1993

[51] Int. Cl.⁶ .......................... B05C 21/00; B32B 1/00; C09J 7/04; C09J 9/00
[52] U.S. Cl. ...................................... 428/40; 427/282; 427/421; 428/202; 428/343; 428/354; 428/375
[58] Field of Search ................. 428/40, 343, 354, 375, 428/202; 427/282, 421

[56] References Cited
U.S. PATENT DOCUMENTS 4,714,633 12/1987 Horiki et al. ........................ 428/40
5,128,176 7/1992 Schmidt ................... 428/40
5,260,097 11/1993 Silvestre ................. 427/282

FOREIGN PATENT DOCUMENTS 365510 4/1990 European Pat. Off. .
384626 8/1990 European Pat. Off. .

*Primary Examiner*—James C. Cannon
*Attorney, Agent, or Firm*—Gary L. Griswold; Walter N. Kirn; William L. Huebsch

[57] ABSTRACT

A method of masking an area of a surface using a length of flexible foam strip having a layer of adhesive applied on opposite sides of the strip. The strip is attached to the surface by one of the layers of adhesive and a sheet of material is attached to the opposite side of the strip by the other of the layers of adhesive. The strip and sheet then isolate the area of the surface from contiguous areas of the surface.

12 Claims, 2 Drawing Sheets

MASKING METHODS USING FLEXIBLE STRIP

TECHNICAL FIELD

The present invention relates to methods for masking an exposed area of a surface from an adjacent area to facilitate treatment of the exposed area by for example paint spraying. The invention has particular, but not exclusive application in the motor industry where selective repairs must be effected on painted surfaces. The invention also relates to a gasketting material for use in such methods.

BACKGROUND ART

Various masking techniques are known for isolating areas from adjacent areas on a surface. Such isolation is needed in a number of situations where treatment of one form or another is to be applied exclusively to a specific area or region. Masking techniques are particularly useful when the treatment involves the application of a fluid medium. Examples are chemical treatments, painting and decorating. Typically, the treatment areas are isolated from their surroundings by a masking tape which defines the boundary thereof.

DISCLOSURE OF INVENTION

The present invention is directed at a masking technique in which the boundary of the treatment area is defined by a length of foam strip adhesively secured to the surface. The strip has a layer of adhesive applied on opposite sides thereof, whereby one layer secures the strip to the surface, and the other is available for attachment to a sheet of material. The sheet of material is attached in such a way that it extends laterally of the strip, protecting the surface adjacent that flank and leaving the surface adjacent the other flank exposed with a sheet of material attached in this way, the strip and sheet thereby isolate an area of the surface from a contiguous area. The sheet of material can be attached on the foam strip with a substantial overlap, and the sheet of material trimmed thereafter before the surface area is treated.

The invention is also embodied in a length of foam strip having a layer of adhesive applied on opposite sides thereof. In preferred embodiments, the adhesive forming one of the layers thereof is more aggressive than the adhesive forming the other layer, and the less aggressive adhesive layer is used to secure the strip to the surface. Thus, in use the more aggressive adhesive is preferentially adhered to the sheet of material, which facilitates the subsequent removal of the strip or mask from the surface. The strip may come in the form of an endless length, and in some embodiments can include a sheet of material secured to the strip by one of the adhesive layers.

In preferred embodiments of the invention, the crossection of the foam strip has a periphery forming a continuous smooth curve. Normally, it will be circular or elliptical. This facilitates the formation of a soft edge between the treated and untreated areas.

BRIEF DESCRIPTION OF THE DRAWING

The invention will now be further described by way of example, and with reference to the accompanying schematic drawings wherein.

DETAILED DESCRIPTION

Figure 1:
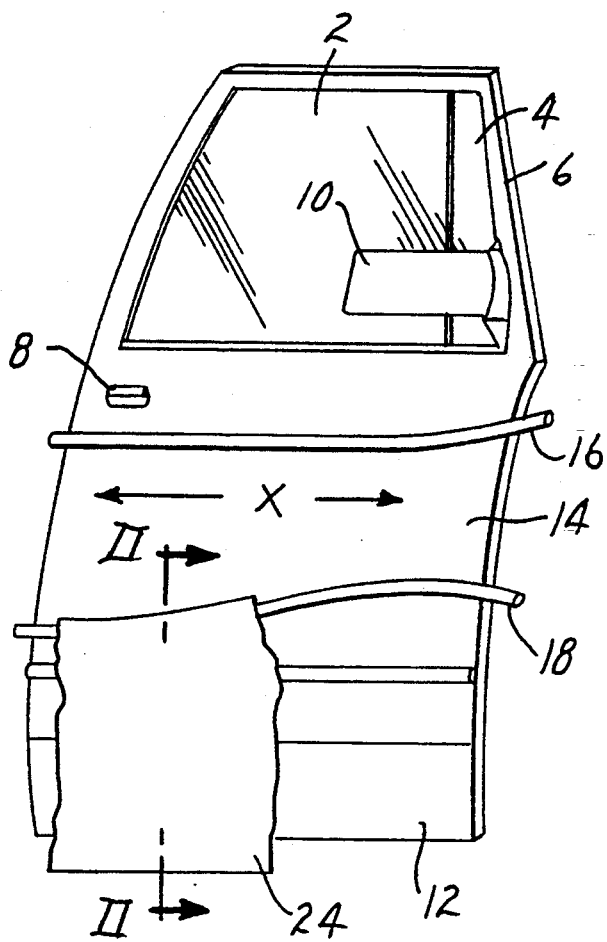
FIG. 1 illustrates a car door with lengths of gasketting material secured thereto.

FIG. 1 is a side view of a car door with a surface area "X" thereof having been repaired, but not yet repainted. The car door is shown separated from the car body, but is otherwise intact with windows 2 and 4, and frame 6 fitted thereto, and door handle 8 and mirror mount 10 still in place. Additionally, at the bottom edge of the door is an extra protective layer 12. Secured to the door panel 14 are two lengths of strip 16, 18 attached by adhesive to undamaged areas of the panel 14. The strips 16 and 18 define two boundaries of the repaired area "X" and thereby separate the repaired area "X" from the undamaged areas of the panel 14 on or in which are mounted auxiliary features (8, 10, and 12).

Figure 2:
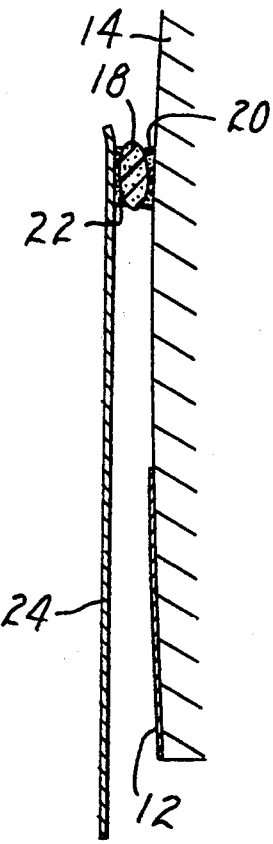
FIG. 2 is a section taken on line II—II of FIG. 1.

In FIG. 1, the strips 16 and 18 are visible and as shown, merely form a divide between adjacent areas of the surface of panel 14. In use, sheets of material 24 would be applied to each strip, the respective sheets extending over the panel and auxiliary components to enable the area "X" to be treated; i.e., in this example spray painted, to complete a repair. The disposition of such a sheet of material is shown in FIG. 2. As can also be seen in FIG. 3, the foam strip bears two separately identifiable layers 20 and 22 of adhesive. Adhesive layer 20 secures the strip 10 to the panel 14. A sheet 24 of flexible material is adhered along a marginal edge portion to the adhesive layer 22. The free edge of the sheet 24, on the right flank of the strip 18 as shown in FIG. 2, can be trimmed so that the foam strip 18 is substantially visible from that side. On the left flank of the strip 18 as shown in FIG. 2, the sheet 24 extends either freely or to a remote securement point which may be on the layer 12, but in any event in such a manner effectively to protect the panel 14 below the strip 18 in FIG. 1 from any overspray directed at the area "X". The area above the strip 16 in FIG. 1 would be similarly protected by the application of a sheet of material (not shown) to the strip 16. Suitable materials for the sheet 24 include paper, coated paper and plastics materials.

Figure 3:
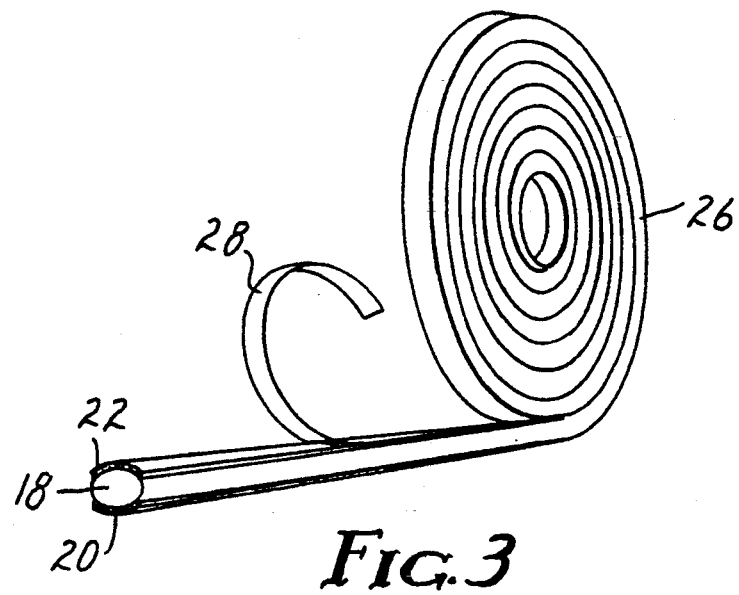
FIG. 3 is a perspective view showing gasketting material according to the invention drawn from a roll thereof.

FIG. 3 shows a foam strip embodying the invention drawn from a roll 26 thereof. The material of the strip will normally be a plastics foam, and is preferably one made in accordance with our published European Patent Specification No. 0384626. Polyether foam is particularly suitable. Various adhesives can be used for the layers 20 and 22, and emulsion adhesives can be satisfactory. In any event, pressure sensitive adhesives are preferred to ensure that the strip can be properly located on the surface. A double sided release liner 28 attached to the adhesive layer 22 is shown peeled away to prepare the exposed length for use. The cross-section of the strip is typically circular or elliptical, with minimum diameters in the range of 15 to 20 mms being preferred.

The adhesive of one layer of the foam strip is normally more aggressive than that of the other. In the example illustrated, the layer 22 is the more aggressive adhesive, and the less aggressive layer 20 is the one that is applied to the panel surface. In order to enable the strip to be used in this manner, the adhesive layers can be distinguished from one another, normally by a visible difference such as colour. Alternatively, the adhesive layers may be applied to the strip in different patterns, and one or each layer may be discontinuous. Normally though, continuous layers are preferred.

In the embodiment of the invention described above, the area "X" of the panel 14 was isolated by the sequential application of the strips 16 and 18, and the sheets 24. This is the normal arrangement, and provides the greatest flexibility, but it will be appreciated that other techniques can be used. For example, it may be desirable to protect an isolated area of a panel from treatment, and such an arrangement is shown in FIGS. 4 and 5.

Figure 4:
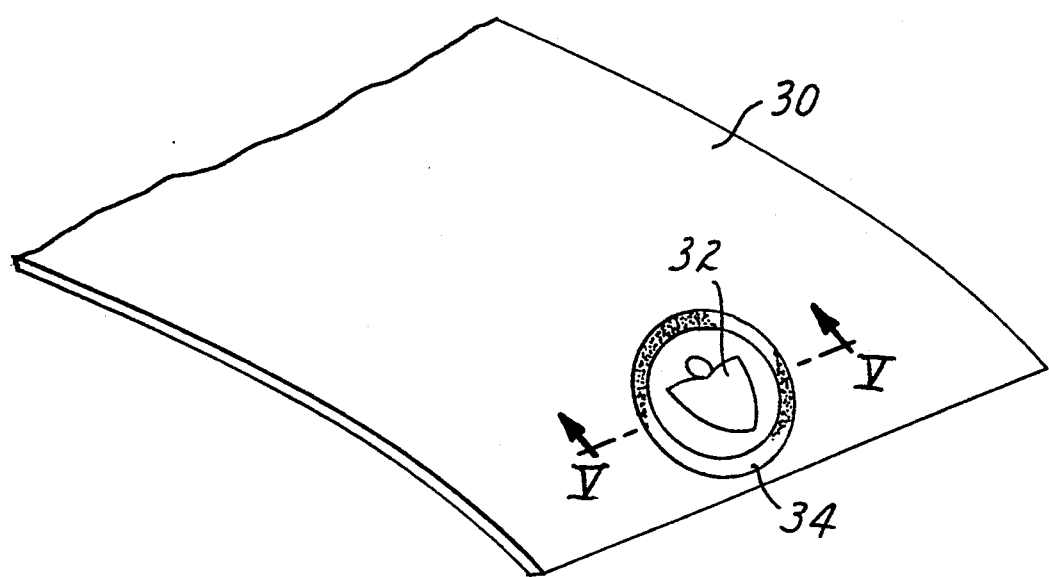
FIG. 4 is a perspective view of a part of a car hood.
Figure 5:
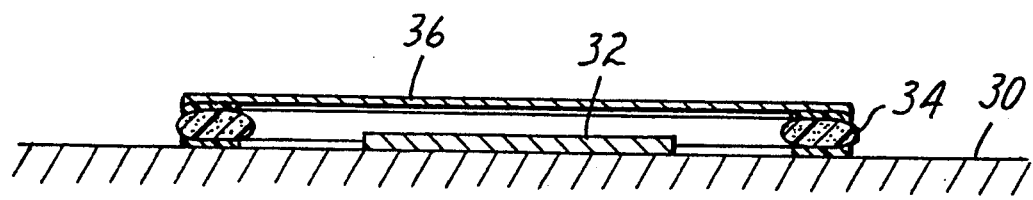
FIG. 5 is a cross-section taken on line V—V of FIG. 4.

FIG. 4 shows the front section of a car hood 30, most of which is to be re-painted. An emblem 32 is mounted on the hood 30, and as the paintwork around the emblem 32 does not require re-painting, this area of the hood is to be isolated from the remainder. To achieve this, a strip 34 of gasketting material according to the invention is applied in a continuous length around the emblem to the surface of the hood 30. This is shown more clearly in FIG. 5. As can be seen, the strip 34 encloses the emblem 32, and a sheet 36 of material adhered to the strip 34 isolates the emblem and its immediate surroundings. It will be appreciated that the arrangement shown in FIG. 5 is substantially the same as that shown in FIG. 2, but with a single length of strip 34 firmly holding the sheet of material 36.

In some further embodiments, a masking unit may be provided with the sheet already adhesively secured to the foam strip. The sheet and strip can be wound on a roll, or provided as a ready made panel, as shown in FIG. 5. Here, the sheet 36 is already adhered to the endless strip 34. It is then possible to isolate an area of the surface in a single exercise.

The technique described herein has particular benefit in paint repairs, as the foam strip greatly facilitates the achievement of a soft edge between painted and unpainted areas. The reason for this is that the circular or elliptical cross-section of the preferred foam strip, as shown for example in FIGS. 2, 3 and 5, avoids the definition of a sharp edge or boundary. The new paint is thus applied in a reducing thickness under the overhanging section of the strip to merge tidily with the contiguous unpainted area. The overhanging section can also be extended if required by the sheet 24 or 36. While paint repairs constitute a preferred application of the invention, the technique is also useful for other surface treatments such as coating, plating and phosphorizing.

I claim:

1. A method of masking a portion of a surface comprising the steps of:
   providing a gasketting material comprising a length of flexible foam strip and first and second layers of adhesive applied on opposite sides of the strip, the adhesive forming the first layer of adhesive being less aggressive than the adhesive forming the second layer of adhesive;
   attaching the strip to the surface by adhering the first less aggressive layer of adhesive on the strip to the surface; and
   attaching a sheet of material to the strip by adhering the sheet of material to the second layer of adhesive so that the gasketting material and sheet isolate the portion of the surface to be masked from a contiguous portion of the surface.

2. A method according to claim 1 further including the step of trimming the sheet adjacent one side of the strip.

3. A method according to claim 1 wherein in said step of attaching a sheet of material a marginal edge portion of the sheet of material is attached to the strip.

4. A method according to claim 1 wherein in said step of attaching the strip the strip is attached to the surface so as to enclose a portion of the surface.

5. A method according to claim 1 wherein the periphery of a cross-section of the foam strip is a continuous smooth curve.

6. A gasketting material comprising a length of flexible foam strip having first and second opposite longitudinally extending surfaces, and a layer of adhesive applied on each of said surfaces, the adhesive in the layer of adhesive on said first surface being more aggressive than the adhesive in the layer of adhesive on said second surface.

7. A gasketting material according to claim 6 wherein said length of foam strip is endless.

8. A gasketting material according to claim 7 further including a sheet of material adhesively secured to the strip by one of said layers of adhesive.

9. A gasketting material according to claim 6 wherein the layers of adhesive on said first and second surfaces are visibly distinguishable from each other.

10. A gasketting material according to claim 8 wherein each of said layers of adhesive is continuous.

11. A gasketting material according to claim 6 wherein the periphery of a cross-section of the foam strip is a continuous smooth curve.

12. A gasketting material according to claim 11 wherein said periphery is either circular or elliptical.

* * * * *